United States Patent [19]

Massey

[11] 4,184,080

[45] Jan. 15, 1980

[54] RATIOMETRIC EDGE DETECTOR SYSTEM

[75] Inventor: William A. Massey, Mt. Holly, N.J.

[73] Assignee: Molins Machine Company, Inc., Cherry Hill, N.J.

[21] Appl. No.: 811,659

[22] Filed: Jun. 30, 1977

[51] Int. Cl.² .......................................... G01N 21/30
[52] U.S. Cl. .................................. 250/548; 250/560; 250/561
[58] Field of Search ................. 250/548, 560, 561, 209

[56] References Cited

U.S. PATENT DOCUMENTS

| | | | |
|---|---|---|---|
| 2,962,596 | 11/1960 | Leimer et al. | 250/548 |
| 3,431,425 | 3/1969 | Brown et al. | 250/548 |
| 3,461,302 | 8/1969 | Benson et al. | 250/548 |
| 3,739,177 | 6/1973 | Ko | 250/561 |
| 3,777,167 | 12/1973 | Shepherd | 250/560 |
| 3,900,738 | 8/1975 | McKay | 250/560 |

Primary Examiner—M. Tokar
Attorney, Agent, or Firm—Seidel, Gonda, Goldhammer & Panitch

[57] ABSTRACT

A ratiometric edge detector system for use in controlling the position of the edge of a web or other material. At least two zones on the web are illuminated with light. The first zone is of greater area than the second zone. The second zone has a border at the web edge. Light reflected from the two zones is optically sensed. A control signal is generated proportional to the ratio of the light reflected from the two zones. The ratio indicates deviation of the web edge from a preselected position.

18 Claims, 9 Drawing Figures

RATIOMETRIC EDGE DETECTOR SYSTEM

BACKGROUND OF THE INVENTION

The present invention is directed to an edge detector system for use in controlling the position of the edge of a flexible web or similar material. In particular, the invention is directed to a ratiometric edge detector system for detecting the position of the edge of a web in a web processing machine and for generating a control signal for use in re-positioning the edge to a pre-selected or home position.

In the manufacture of corrugated paperboard, three plies of paper are combined to form a rigid, continuous web of board. The web may be slit, scored and cut to suitable sizes to form sheets which are subsequently processed into boxes. In combining the plies of paper, the plies must be maintained in relatively close relation to avoid waste. Additionally, the combined board must not be allowed to drift from its preselected path while being slit and scored.

Various web-guiding and tracking mechanisms are known for confining the webs of paper and board to a preselected path. For the most part, the mechanisms have been troublesome and unreliable.

In general, the web-guiding and tracking mechanisms known in the art fall into two classes: mechanical and optical. Those devices which mechanically sense the edge of the paper are structurally complex. In addition, the edge of the web may not be sufficiently rigid to exert an adequate force on the mechanical sensing member employed, rendering the mechanism unreliable. The optical mechanisms known in the art may not be able to cope with fluctuations in the texture and color of the web. The mechanisms may not be able to compensate for variations in the distances between the optical components and the web during web travel. Further, the mechanisms often require monitoring of both edges of the web and may be insensitive to lateral movement of the web within a deadband.

U.S. Pat. No. 3,368,726 describes an optical web tracking mechanism which suffers from the afore-mentioned disadvantages. The mechanism includes first and second optical assemblies. The first assembly includes a light source and a pair of binary optical sensors juxtaposed with one edge of the web. The second assembly includes a light source and a single binary optical sensor juxtaposed with the opposite edge of the web. The light sources and sensors must be disposed on both sides of the web.

When the web is in the home position, two of the sensors are blocked from receiving light by the web. Only the third sensor is exposed to light. Lateral movement of the web beyond a deadband exposes one or more of the blocked sensors and blocks the previously exposed sensor. The change in binary outputs of the sensors is detected to indicate lateral movement of the web. Mounting of the optical components is unduly complex since the components must be oriented on both sides of the web. Lateral movement of the web within the deadband does not apparently result in a change in binary output of the optical components. Tracking of the edge position, therefore, is relatively imprecise.

U.S. Pat. No. 3,753,381 also describes an optical web tracking mechanism. The mechanism includes a pair of optical sensors. One sensor detects light reflected from the web while the other sensor detects light reflected from a reference background. Lateral movement of the web beyond a deadband results in either of two conditions. First, both sensors may detect light reflected from the web. Alternatively, both sensors may detect light reflected from the reference background. The optical components are apparently sensitive to variations in web texture and color. Apparently, the mechanism cannot compensate for variations in the distance between the optical components and the web during web travel. The mechanism is particularly objectionable because it requires a reference surface or light source to be mounted below the web. In paper processing operations, dust often accumulates on the surfaces of machine components. The accumulation of dust on the reference surface could result in an erroneous measurement of edge position.

U.S. Pat. No. 3,090,434 also describes an optical web tracking mechanism. The mechanism includes two pairs of light sources and optical sensor disposed along both edges of the web. Lateral movement of the web continuously varies the amount of light received by each sensor. At the home position of the web, the sensors detect equal amounts of light. The mechanism is objectionable because it requires mounting of optical components on both sides of the web, and because the optical components must be mounted in juxtaposition with both edges of the web. The mechanism apparently is unable to compensate for variations in the distance between the optical components and the web during web travel.

An advantage of the present invention is that the position of the edge of the web can be precisely controlled with no deadband.

Another advantage of the invention is that the position of the edge of the web can be controlled independently of texture and color variations of the web.

A further advantage of the invention is that the optical components can be conveniently mounted in proximity on one side of the web so that adjustment of repair of the components can be easily effected.

A still further advantage of the invention is that it automatically compensates for variations in the distance between the optical components and the web during web travel.

SUMMARY OF THE INVENTION

A ratiometric edge detector system for use in controlling the position of the edge of a web or other material. First means illuminates first and second zones on the web. The first zone is of greater area than the second zone. The second zone has as a border an edge of the web. Second means optically senses the light reflected from the first and second zones on the web. Third means operatively connected to the second means generates a control signal proportional to the ratio of the light reflected from the first and second zones.

For the purpose of illustrating the invention, there is shown in the drawings forms which are presently preferred; it being understood, however, that this invention is not limited to the precise arrangements and instrumentalities shown.

DETAILED DESCRIPTION OF THE PRESENT INVENTION

Figure 1:
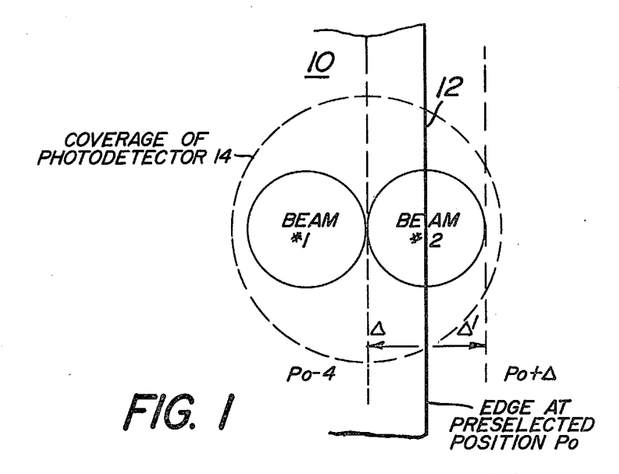
FIG. 1 is a top view of light beam patterns incident on a web at a preselected edge position for two embodiments of the present invention.

Referring to the drawings in detail, wherein like numerals indicate like elements, there is shown in FIG. 1 a web or other material 10 having an edge 12 located at a pre-selected or home position Po. The web 10 may, for example, be a web fed through a corrugator machine for purposes of slitting, scoring and so forth. In such a machine, the position of the edge 12 of the web must be maintained at the pre-selected position Po to insure reliable operation of the machine. The web 10, however, often drifts transversely as indicated by arrows A and B causing the edge 12 to travel from the preselected or home position Po. The present invention detects the extent of travel of the web in the directions A and B to return the edge 12 to the preselected position.

In one embodiment of the invention, a pair of light sources such as light emitting diodes (Leds) generate two discrete light beams #1 and #2 incident on one side of the web 10. See FIG. 1. The beams are oriented so that the position of the edge 12 has a major influence on the relative reflection of the beams from the web 10. The beams are non-coincident as shown in FIG. 1. When the edge 12 is at the preselected position Po, the edge intersects the illumination pattern of beam #2 while the entire illumination of beam #1 is incident on the web 10. Preferably, the edge bisects the illumination pattern of beam #2. A photodetector 14 is oriented on the same side of the web 10 as the sources of light beams #1 and #2 to cover the illumination patterns of both light beams. The photodetector 14 will therefore sense reflection of light beams #1 and #2 from the web 10.

Figure 2:
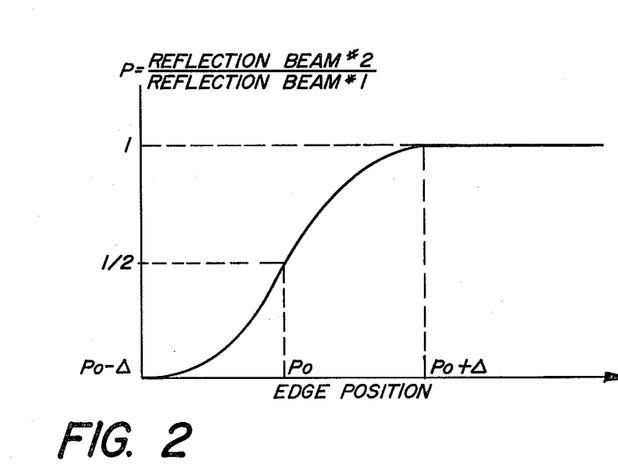
FIG. 2 is a graph representative of the change in the ratio of intensities of light reflected from the web in FIG. 1 as a function of edge position for equal intensity light beams.

If the intensities of the light beams #1 and #2 incident on the web 10 are equal, the ratio of the intensities of the light reflected from the web due to the beams, designated $\beta$, will vary with the position of edge 12 relative to the preselected position Po as shown in the graph in FIG. 2. When the edge 12 is at the preselected position Po, the ratio $\beta$ is 0.5 since beam #2 is bisected by edge 12 and only one-half of beam #2 strikes the web 10, both beams being of the same intensity. When the edge 12 is at the position Po+$\Delta$, the ratio $\beta$ is 1.0 since both light beams #1 and #2 are reflected equally from web 10. When the edge 12 is at the position Po−$\Delta$, the ratio $\beta$ is zero since beam #2 is not incident on the web at all. Accordingly, the ratio $\beta$ defines the position of edge 12. The ratio $\beta$ is substantially independent of changes in reflectivity of the surface of web 10 due to fluctuations in texture or color of the web.

Figure 3A:
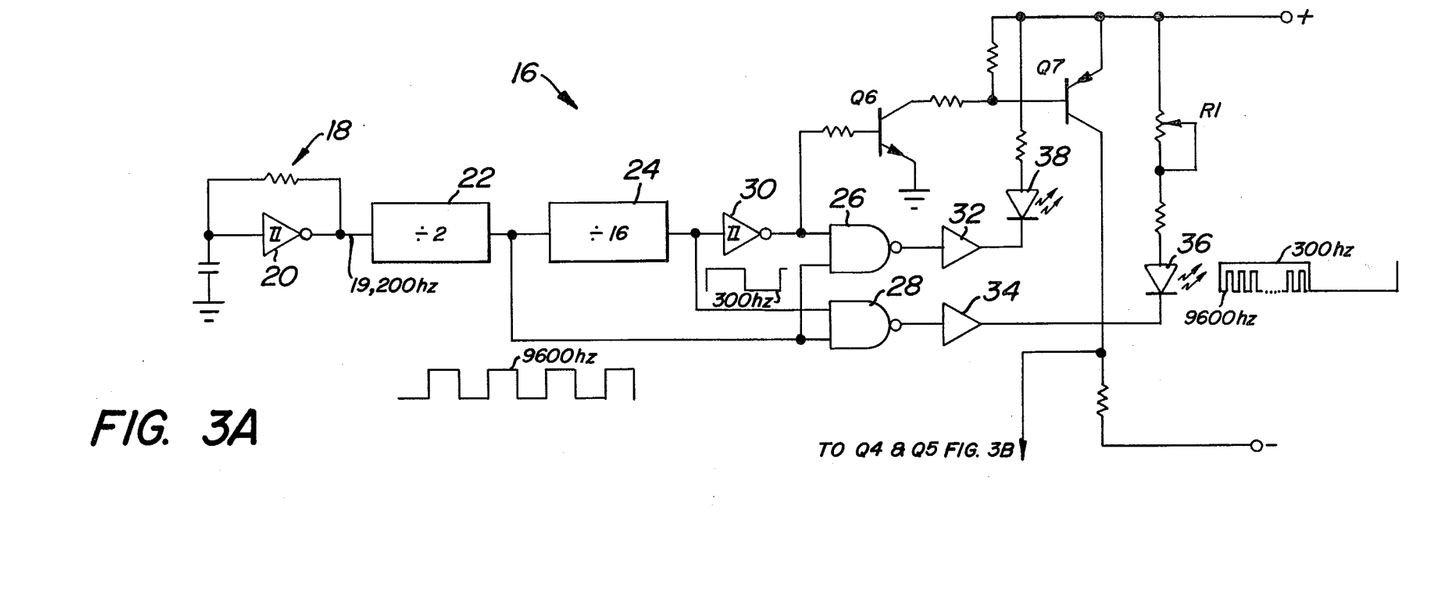
FIGS. 3A and 3B comprise an electrical schematic of an embodiment of the ratiometric edge detector system of the present invention in connection with FIG. 1.
Figure 3B:
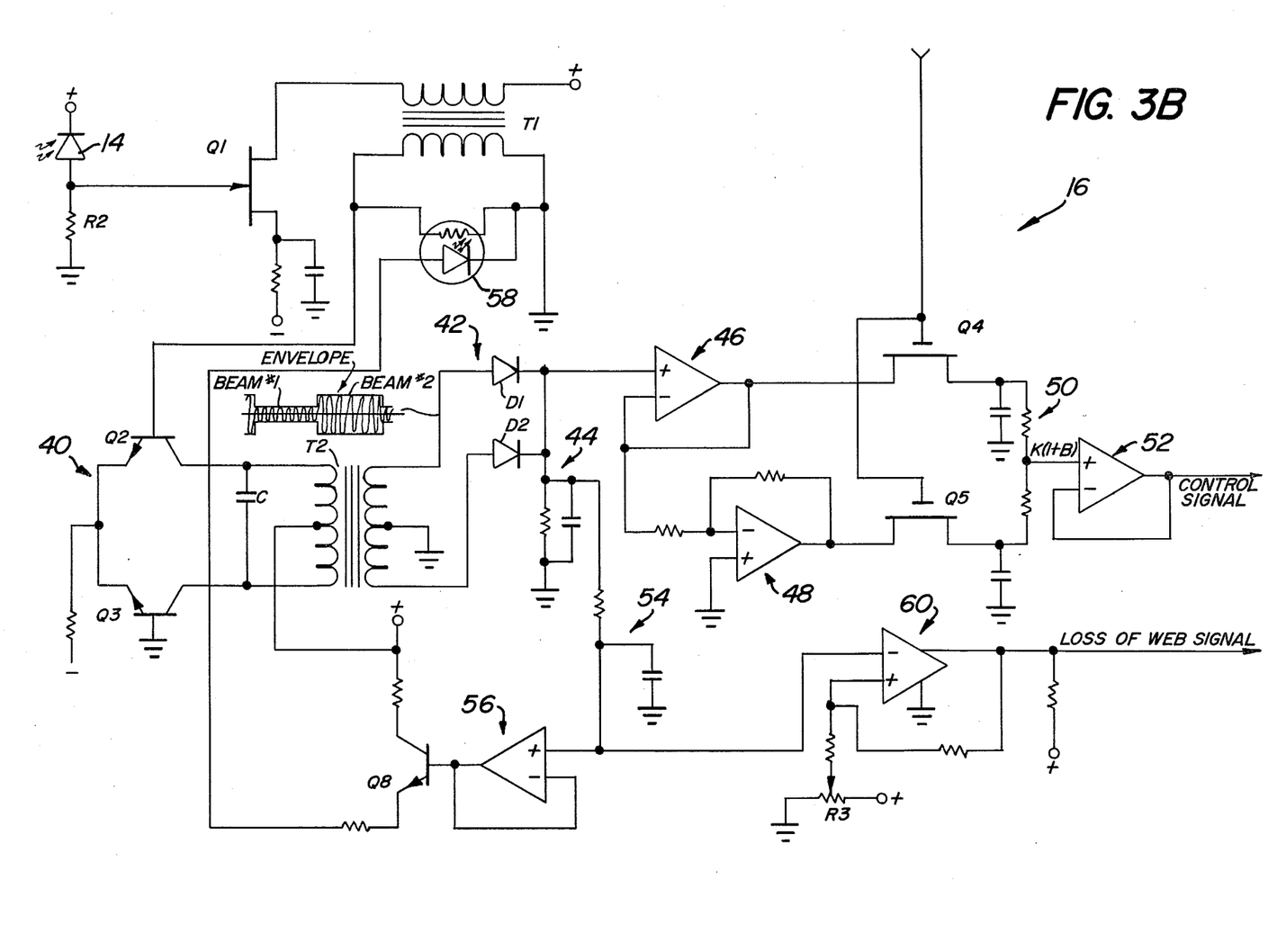

A ratiometric edge detector system 16 for detecting the position of edge 12 as a function of the ratio $\beta$ in accordance with the embodiment of the invention described in connection with FIG. 1 is shown in FIGS. 3A and 3B. An oscillator 18, including a Schmitt trigger inverter 20, generates a pulse train at a pulse repetition frequency of approximately 19,200 hz. The frequency of the oscillator pulse train is divided down to approximately 9,600 hz by divide by 2 circuit 22. The output of the divide by 2 circuit is divided down to 300 hz by divide by 32 circuit 24. The 9600 hz pulse train is fed to NAND gates 26 and 28. The 300 hz pulse train is fed directly to NAND gate 28 and is transmitted via Schmitt trigger inverter 30 to NAND gate 26. The outputs of NAND gates 26 and 28 are transmitted to buffer/drivers 32 and 34 respectively. Preferably, buffer/drivers 32 and 34 are of the type having open collector, high-voltage outputs.

When the 300 hz pulse train is high, an led 36 is driven by the 9600 hz pulse train via NAND gate 28 and buffer/driver 34. The current through led 36 is adjusted by means of resistor R1. At the same time, the inverted 300 hz pulse train at the output of inverter 30 maintains led 38 off by disabling NAND gage 26. When the 300 hz pulse train is low, the 9600 hz pulse train drives led 38 via NAND gate 26 and buffer/drive 32. At the same time, the 300 hz pulse train maintains led 36 off by disabling NAND gate 28. Accordingly, led 36 is pulsed at a 9600 hz rate during the first or high half cycle of the 300 hz pulse train, and led 38 is pulsed by the 9600 hz pulse train during the second or low half cycle of the 300 hz pulse train. During each half cycle that one of the led's is being pulsed, the other led is maintained "off". Led's 36 and 38 generate light beams #1 and #2 which beams are respectively incident on the web 10. Preferably, resistor R1 is adjusted so that the light intensity of led 36 is approximately one-half the light intensity of led 38. Accordingly, the intensity of beam #1 will be one-half that of beam #2. This ensures that the ratio $\beta$ will be 1.0, rather than 0.5, when edge 12 is at the preselected position Po as will be evient from further description of the edge detector system 16 hereinafter.

The light reflected from web 10 due to beams #1 and #2 is sensed by photodetector 14. See FIG. 3B. Photodetector 14 has a viewing angle which spans the combined illumination patterns of both beams #1 and #2 as shown in FIG. 1. The reflected light sensed by photodetector 14 produces a current through resistor R2. See FIG. 3B. The voltage across resistor R2 drives the gate of FET Q1. The voltage is amplified by FET Q1 and coupled via transformer T1 to a push-pull amplifier circuit 40 comprising transistors Q2 and Q3. The push-pull amplifier circuit 40 also includes a capacitor C which is chosen to peak the output of the circuit at 9600 hz.

The output of the push-pull circuit 40 is coupled via transformer T2 to a full-wave rectifier circuit 42 comprising diodes D1 and D2. The input to the full-wave rectifier circuit 42 is a time division multiplexed sinusoidal signal having an envelope proportional to the light reflected from web 10 due to light beam #1 or light beam #2. Thus, the amplitude variation of the envelope is a function of the position of edge 12 with respect to the preselected position Po.

The output of rectifier circuit 42 is filtered by RC filter circuit 44 to detect the envelope of the time division multiplexed signal. The detected envelope at the output of filter circuit 44 is buffered in operational amplifier 46 and is inverted in operational amplifier 48. Accordingly, the detected envelope drives the source of FET Q4 while the inverse of the detected envelope drives the source of FET Q5.

The FET's Q4 and Q5 de-multiplex the detected envelope. Thus, the 300 hz pulse train at the output of Schmitt trigger inverter 30 is amplified by transistors Q6 and Q7. See FIG. 3A. The amplified signal drives the gates of FET's Q4 and Q5. See FIG. 3B. The signals at the drains of FET's Q4 and Q5 respectively represent the intensities of the light reflected from the web 10 due to beams #2 and #1. The difference between the drain signals is obtained by means of voltage divider 50 which drives the input of operational amplifier 52. The output of the voltage divider 50 is proportional to the ratio $\beta$. Accordingly, the control signal output of the operational amplifier 52 is proportional to the ratio $\beta$. The control signal output of the operational amplifier 52 can be used to drive a positioning mechanism to re-position the web 10 so that edge 12 returns to the pre-selected position wherein beam #2 is bisected by the edge. When this condition occurs, the ratio $\beta$ will be 1.0 since the intensity of beam #1 emitted by led 36 is adjusted by means of resistor R1 to be half the intensity of beam #2 emitted by led 38 as already explained.

To compensate for the effects of variations in the distance between web 10 and the led's 36 and 38 and photodetector 14 during web travel, the edge detector system is provided with an AGC loop comprising an averaging filter 54, operational amplifier 56, transistor Q8 and photon coupler 58. See FIG. 3B. Averaging filter 54 provides an input to operational amplifier 56 which represents the average of the envelope of the time division multiplexed signal at the input to rectifier circuit 42. The output of operational amplifier 56 drives the photon coupler 58 via transistor Q8. The impedance of the photon coupler is shunted across the secondary of transformer T1. As a result, the impedance across the secondary varies as a function of the average envelope signal. This effectively controls the gain of the push-pull amplifier circuit 40 and holds the output of the filter circuit 44 constant despite fluctuations in the envelope of the time division multiplexed signal which may result from variations in in the distance between the web 10 and led's 36 and 38 and photodetector 14.

The average envelope signal developed by averaging filter circuit 54 may also be used to provide an indication that the web is outside the field of view of the photodetector 14. The output of the averaging filter circuit 54 is fed to a differential comparator 60 which compares the average envelope signal to a threshold which may be adjusted by means of resistor R3. If the average envelope drops below this threshold, differential comparator 60 generates a "loss of web" signal which may be used to operate an alarm such as a light or horn to indicate to an operator that the web has been moved, cut or exhausted.

The embodiment of the invention described above utilizes time division multiplexing to track the edge position. The principles of the present invention, however, may be practiced without time division multiplexing.

Figure 4:
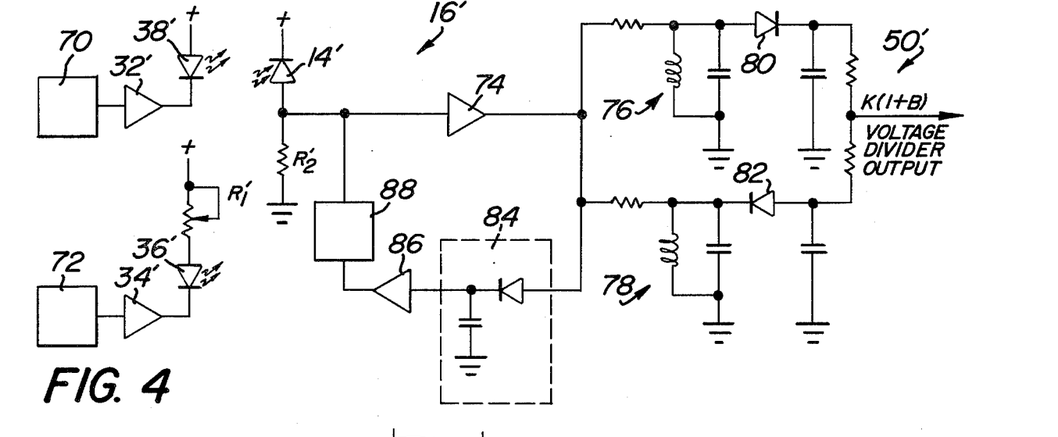
FIG. 4 is an electrical schematic of another embodiment of the ratiometric edge detector system of the present invention in connection with FIG. 1.

Referring to FIG. 4, there is shown an edge detector system 16' for detecting the position of edge 12 as a function of the ratio $\beta$ in accordance with a second embodiment of the invention which employs a frequency discrimination technique instead of time division multiplexing. An oscillator 70 generates a pulse train at a pulse repetition frequency of approximately 5000 hz. The 5000 hz pulse train drives an led 38' via a buffer/driver 32'. Led 38', therefore, is pulsed on and off at a rate of approximately 5000 hz. An oscillator 72 generates a second pulse train at a pulse repetition frequency of approximately 7000 hz. The 7000 hz pulse train drives an led 36' via a buffer/driver 34'. Led 36', therefore, is pulsed on and off at a rate of approximately 7000 hz.

Leds 36' and 38' generate beam #1 and #2 respectively which beams are incident on the web 10. See FIG. 1. Preferably, resistor R1' is adjusted so that the light intensity of led 36' is one-half the light intensity of led 38'. Accordingly, the ratio $\beta$ will be 1.0 when edge 12 is at the preselection position Po as already explained.

The light reflected from web 10 due to beams #1 and #2 is sensed by a photodetector 14'. See FIG. 4. Photodetector 14' is oriented on the same side of the web 10 as leds 36' and 38'. Photodetector 14' has a viewing angle which covers the illumination patterns of both beams #1 and #2 as shown in FIG. 1. The reflected light sensed by photodetector 14' produces a current through resistor R2'. See FIG. 4. The voltage across resistor R2' drives an amplifier 74. the output of the amplifier contains the 5000 hz and 7000 hz frequencies received by photodetector 14'. The output of amplifier 74 is filtered by LC filters 76 and 78. LC filters 76 and 78 are centered at the 5000 hz and 7000 hz frequencies respectively. The LC filters, therefore, separate the signals due to leds 36' and 38'.

The output of LC filter 76 is rectified by diode 80. The rectified output of LC filter 76 has an envelope proportional to the light reflected from web 10 due to light beam #2.

The output of LC filter 78 is rectified by diode 82. Diodes 80 and 82 are oppositely poled. The rectified output of LC filter 78 has an envelope proportional to the light reflected from web 10 due to light beam #1.

The rectified outputs of LC filters 76 and 78 are of opposite polarity. The difference between these outputs is obtained by means of voltage divider 50'. The output of the voltage divider 50' is proportional to the ratio $\beta$. The output of the voltage divider can be used to operate a positioning mechanism to re-position the web 10 so that edge 12 returns to the preselected position wherein beam #2 is bisected by the edge. When this condition occurs, the ratio $\beta$ will be one since the intensity of beam #1 emitted by led 36' is preferably adjusted by means of resistor R1' to be one-half the intensity of beam #2 emitted by led 38'.

To compensate for the effect of variations in distance between web 10 and the leds 36' and 38' and photodetector 14' during web travel, the edge detector system 16' is provided with an AGC loop comprising a rectifier circuit 84, amplifier 86 and variable impedance element 88. The variable impedance element may be a transistor-photon coupler pair or any other suitable element whose impedance can be varied as a function of the output of amplifier 86. Rectifier circuit 84 provides an input to amplifier 86 which represents the average of the envelope of the output of amplifier 74. Accordingly, amplifier 86 controls the impedance of element 88 as a function of the average envelope signal. This effectively controls the gain of the amplifier 74 and holds the output of the amplifier constant despite the fluctuations in the voltage across resistor R2' due to variations in the distance between web 10 and leds 36' and 38' and photodetector 14'.

Figure 5:
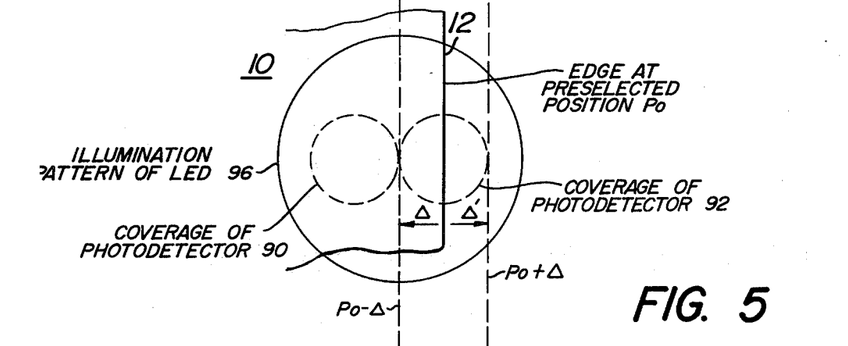
FIG. 5 is a top view of a light beam pattern incident on a web at a preselected edge position for another embodiment of the present invention.

Although two embodiments of the invention have been described in terms of a pair of non-coincident light beams and a single photodetector having a relatively wide field of view, the invention can also be practiced utilizing a single light source having a relatively wide illumination pattern and two separate photodetectors having relatively narrow non-coincident fields of view within the illumination pattern. In this embodiment of the invention, a single light source such as an led generates a relatively wide light beam incident on one side of the web 10. See FIG. 5. Photodetectors 90 and 92 are oriented on the same side of the web 10 as the source of the light beam. The photodetectors have relatively narrow non-coincident fields of view within the illumination pattern. The photodetectors are oriented so that the position of the edge 12 has a major influence on the reflected light received by photodetector 92. When the edge 12 is at the preselected position Po, the edge intersects the field of view of photodetector 92 while the entire field of view of photodetector 90 lies on the web 10. Preferably, the edge bisects the field of view of photodetector 92.

Figure 6:
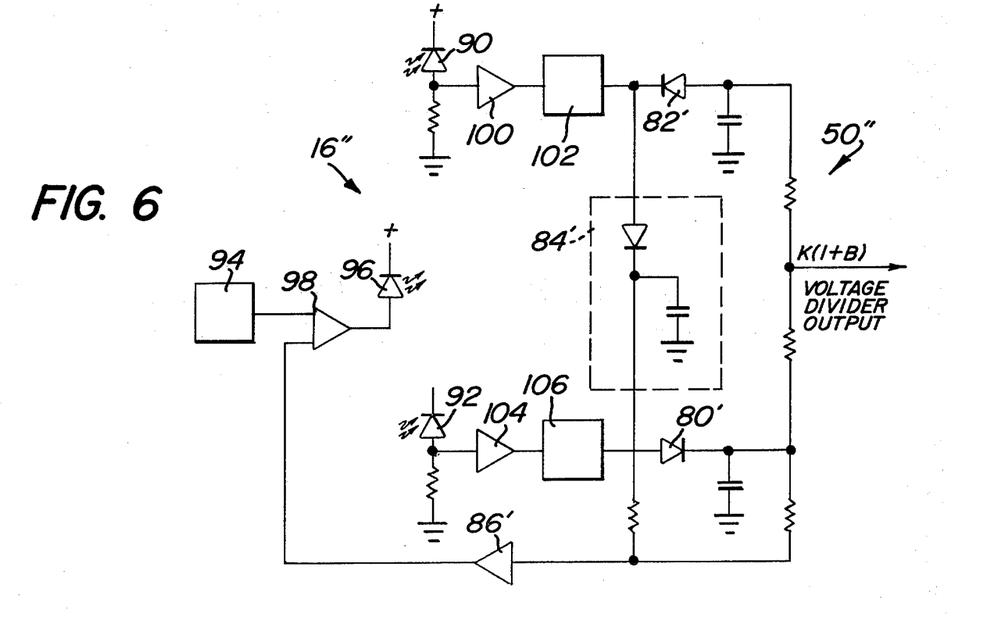
FIG. 6 is an electrical schematic of an embodiment of the ratiometric edge detector system of the present invention in connection with FIG. 5.

An edge detector system 16" for detecting the position of edge 12 as a function of the ratio $\beta$ in accordance with this embodiment of the invention is shown in FIG. 6. An oscillator 94 generates a pulse train at a pulse repetition frequency of approximately 5000 hz. The 5000 hz pulse train drives led 96 via a variable gain amplifier 98.

The light reflected from web 10 due to the light beam generated by led 96 is sensed by photodetectors 90 and 92. The light reflected from web 10 always fills the field of view of photodetector 90. In contrast, the light reflected from web 10 only partially fills the field of view of photodetector 92 when edge 12 is at the preselected position Po. The reflected light sensed by photodetector 90 produces a voltage signal at the input to amplifier 100. The signal is amplified by amplifier 100 and filtered by filter 102. Filter 102 is centered at approximately 5000 hz. The filter output is rectified by diode 82' and fed to voltage divider 50".

The reflected light sensed by photodetector 92 produces a voltage signal at the input to amplifier 104. This signal is amplified by amplifier 104 and filtered by filter 106. Filter 106 is also centered at the 5000 hz frequency. The output of filter 106 is rectified by diode 80'. The rectified signal is fed to the voltage divider 50". Diodes 80' and 82' are oppositely poled. The voltage divider 50" obtains the difference between the rectified signals produced by the diodes. The output of the voltage divider 50" is therefore proportional to the ratio $\beta$. The output of the voltage divider can be used to drive a positioning mechanism to re-position the web 10 so that the edge 12 returns to the preselected position wherein the field of view of photodetector 92 is bisected by the edge.

To compensate for the effect of variations in distance between the web 10 and the led 96 and photodetectors 90 and 92, edge detector system 16" is provided with an AGC loop comprising a rectifier circuit 84' and an amplifier 86' which controls the gain of the variable gain amplifier 98. The input to amplifier 86 represents the combined envelopes of the outputs of photodetectors 90 and 92. The output of amplifier 86' controls the gain of variable gain amplifier 98. The variable gain amplifier controls the intensity of the light beam emitted by led 96 to compensate for variations in the distance between web 10 and led 96 and photodetectors 90 and 92.

Although three embodiments of the invention have been described, the invention is not limited to any one embodiment per se. Thus, the invention is generally directed to a ratiometric edge detector system wherein light reflected from at least two non-coincident zones on the web is detected. One zone is of a greater area than the other zone. The zone of lesser area is bordered by an edge of the web. Light reflected from both zones on the web is optically sensed and at least two discrete signals are generated, each signal having an envelope proportional to the light reflected from one of the zones. A control signal proportional to the ratio of the envelopes is obtained for use in repositioning the web edge.

In two embodiments of the invention, the zones on the web are illuminated by two discrete light sources such as leds and reflected light is sensed by a single photodetector. In one such embodiment, the leds are alternately excited at a predetermined frequency. In a second embodiment, the leds are simultaneously excited but a different frequencies. In a third embodiment of the invention, the zones on the web are illuminated by a single light source and reflected light is sensed by two discrete photodetectors.

In each of the embodiments, the detection of edge position is virtually immune to variatons in distance between the web and the optical components. Such immunity may be enhanced by relative placement of the optical components as shown in FIGS. 7A and 7B.

Figure 7A:
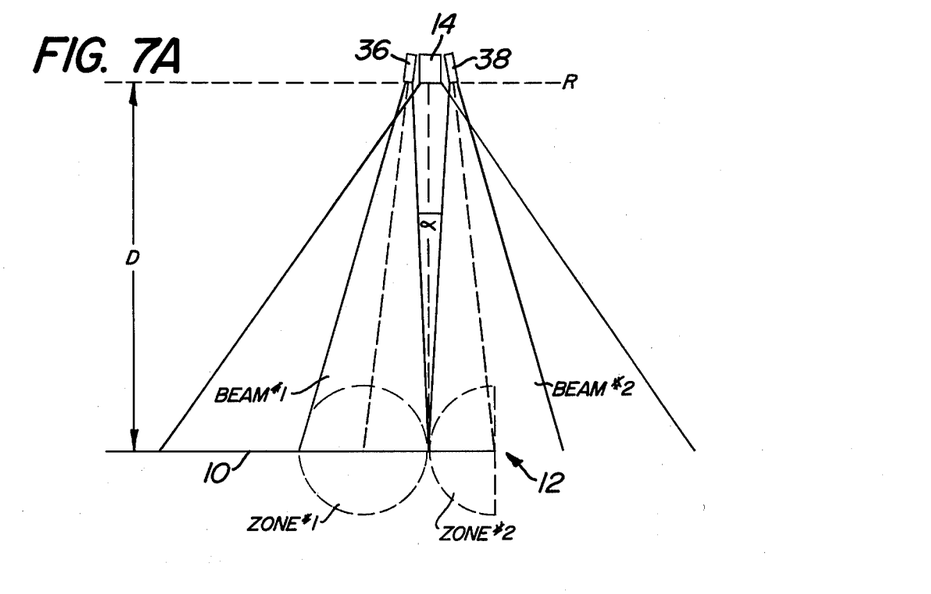
FIGS. 7A and 7B are diagrams of preferred geometries for the optical components in the invention.

In FIG. 7A, the photodetector 14 and leds 36 and 38 are substantially co-linear along line R. The photodetector and leds are oriented so that the edges of the field of view of the photodetector intersect the edges of beams #1 and 2 relatively close to the line R but relatively far from the web 10. Accordingly, the distance D between web 10 and the optical components may decrease considerably while the zones #1 and 2 on the web remain completely within the field of view of the photodetector. Additionally, the leds 36 and 38 are oriented so that the angle $\alpha$ between beams #1 and 2 is sufficiently acute to limit overlap of the beams as the distance D increases.

Figure 7B:
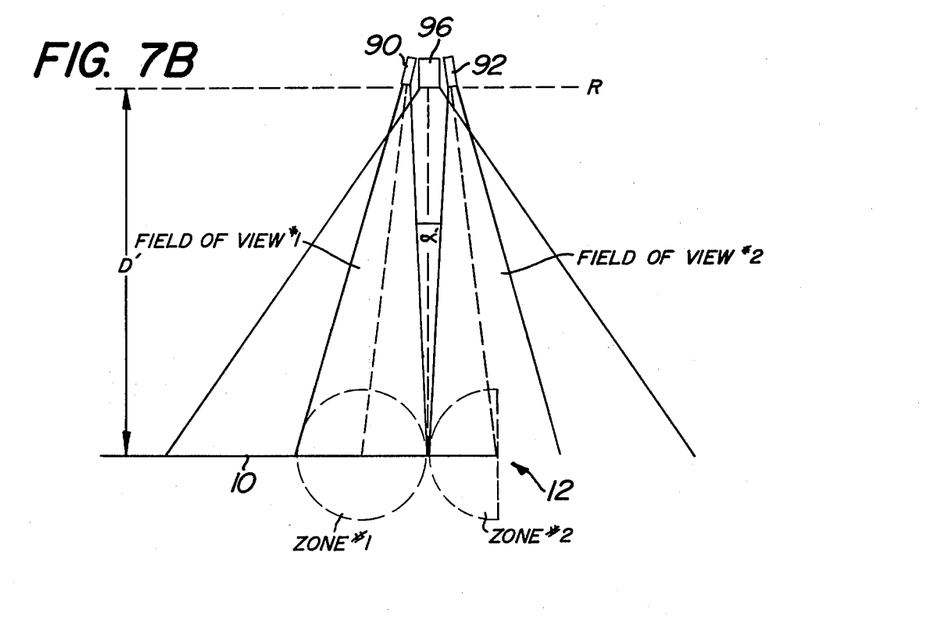

In FIG. 7B, the led 96 and photodetectors 90 and 92 are substantially co-linear along line R'. The led and photodetectors are oriented so that the edges of fields of view #1 and 2 of photodetectors 90 and 92 intersect the edge of the beam generated by led 96 relatively close to the line R' but relatively far from the web 10. The distance D' between the optical components and the web may therefore decrease considerably while the zones #1 and 2 on the web remain completely within the beam generated by led 96. The photodetectors 90 and 92 are oriented so that the angle $\alpha'$ between their fields of view is sufficiently acute to limit overlap of the fields of view as the distance D' increases.

An advantage of the invention is that it provides a precise and reliable indication of the position of the edge of the web substantially independently of changes in the surface reflectivity of the web and substantially independent of the location of the various optical components relative to the web.

The present invention may be embodied in other specific forms without departing from the spirit or essential attributes thereof and, accordingly, reference should be made to the appended claims, rather than to the foregoing specification as indicating the scope of the invention.

I claim:

1. A ratiometric edge detector system for use in controlling the position of the edge of a web, comprising:
   first means for illuminating first and second zones on a web, said first zone being of a greater area than said second zone and said second zone having as a border an edge of the web,
   second means for optically sensing light reflected from said first and second zones on said web, and
   third means operatively connected to said second means for generating a control signal proportional to the ratio of light reflected from said first and second zones.

2. The ratiometric edge detector system according to claim 1 including means for maintaining said control signal substantially constant regardless of the distance of said first and second means from said web.

3. The ratiometric edge detector system according to claim 1 wherein said first means includes at least two light sources, means for modulating the intensity of each of said light sources, and means for alternately exciting the light sources.

4. The ratiometric edge detector system according to claim 1 wherein said first means includes at least two light sources, means for modulating the intensity of one of said light sources at a first pulse repetition frequency, and means for modulating the intensity of the other of said light sources at a second pulse repetition frequency, said first and second pulse repetition frequencies being different.

5. The ratiometric edge detector system according to claim 1 wherein said second means includes at least two photodetectors.

6. A method of detecting the position of the edge of a web, comprising:
   illuminating first and second zones on a web, said first zone being of greater area than said second zone and said second zone having as a border an edge of the web,
   optically sensing the light reflected from said first and second zones on said web, and
   generating a control signal proportional to the ratio of light reflected from said first and second zones.

7. An ratiometric edge detector system for use in controlling the position of the edge of a web, comprising:
   first means for alternately generating at least first and second light beams incident on the web, said first light beam being incident on a first zone of said web and said second light beam being incident on a second zone of said web, said first zone being of greater area than said second zone, said second zone having as a border an edge of said web.
   second means for optically sensing the light reflected from said first and second zones on said web,
   third means operatively connected to said second means for generating a control signal proportional to the ratio of light reflected from said first and second zones.

8. The ratiometric edge detector system according to claim 7 wherein said first means includes at least two light sources, means for modulating the intensity of each of said light sources, and means for alternately exciting the light sources.

9. The ratiometric edge detector system according to claim 8 wherein said third means includes means for generating a time division multiplex signal having an envelope proportional to the light reflected from said first and second zones on said web, and means for demultiplexing said time division multiplexed signal.

10. The ratiometric edge detector system according to claim 7 including means for maintaining said control signal substantially constant regardless of the distance of said first and second means from said web.

11. The ratiometric edge detector system according to claim 9 including means for indicating that the average of the envelope of said timed division multiplexed signal is below a pre-selected threshold.

12. A ratiometric edge detector system for use in controlling the position of the edge of a web comprising:
   first means for simultaneously generating at least first and second modulated light beams incident on a web, said first light beam being incident on a first zone of said web at a first modulation frequency, said second light beam being incident on a second zone of said web at a second modulation frequency, said first zone being of greater area than said second zone, said second zone having as a border an edge of said web,
   second means for optically sensing light reflected from said first and second zones on said web,
   third means operatively connected to said second means for generating a control signal proportional to the ratio of the light reflected from said first and second zones.

13. The ratiometric edge detector system according to claim 12 including means for maintaining said control signal substantially constant regardless of the distance of said first and second means from said web.

14. A method of detecting the position of the edge of a web, comprising:
   alternately generating at least first and second light beams incident on a web, said first light beam being incident on a first zone of said web and said second light beam being incident on a second zone of said web, said first zone being of greater area than said second zone, said second zone having as a border an edge of said web,
   optically sensing the light reflected from said first and second zones on said web, and
   generating a control signal proportional to the ratio of light reflected from said first and second zones.

15. A method of detecting the position of the edge of a web, comprising:
   generating simultaneously at least first and second modulated light beams incident on a web, said first light beam being incident on a first zone of said web at a first modulation frequency, said second light beam being incident on a second zone of said web at a second modulation frequency, said first zone being of greater area than said second zone, said second zone having as a border an edge of said web,
   optically sensing light reflected from said first and second zones on said web, and
   generating a control signal proportional to the ratio of the light reflected from said first and second zones.

16. A ratiometric edge detector system for use in controlling the position of the edge of a web, comprising:
   first means for illuminating first and second zones on a web, said first zone being of greater area than said second zone and said second zone having as a border an edge of the web, at least first and second photodetectors for optically sensing light reflected from said first and second zones on said web, and third means operatively connected to said first and second photodetectors for generating a control signal proportional to the ratio of light reflected from said first and second zones.

17. The ratiometric edge detector system according to claim 16 including means for maintaining said control signal substantially constant regardless of the distance of said first means and said first and second photodetectors from said web.

18. A method of detecting the position of the edge of a web, comprising:

illuminating first and second zones on a web, said first zone being of greater area than said second zone and said second zone having as a border an edge of the web, optically sensing the light reflected from said first and second zones on said web at the same time, and generating a control signal proportional to the ratio of light reflected from said first and second zones.

* * * * *